UNITED STATES PATENT OFFICE.

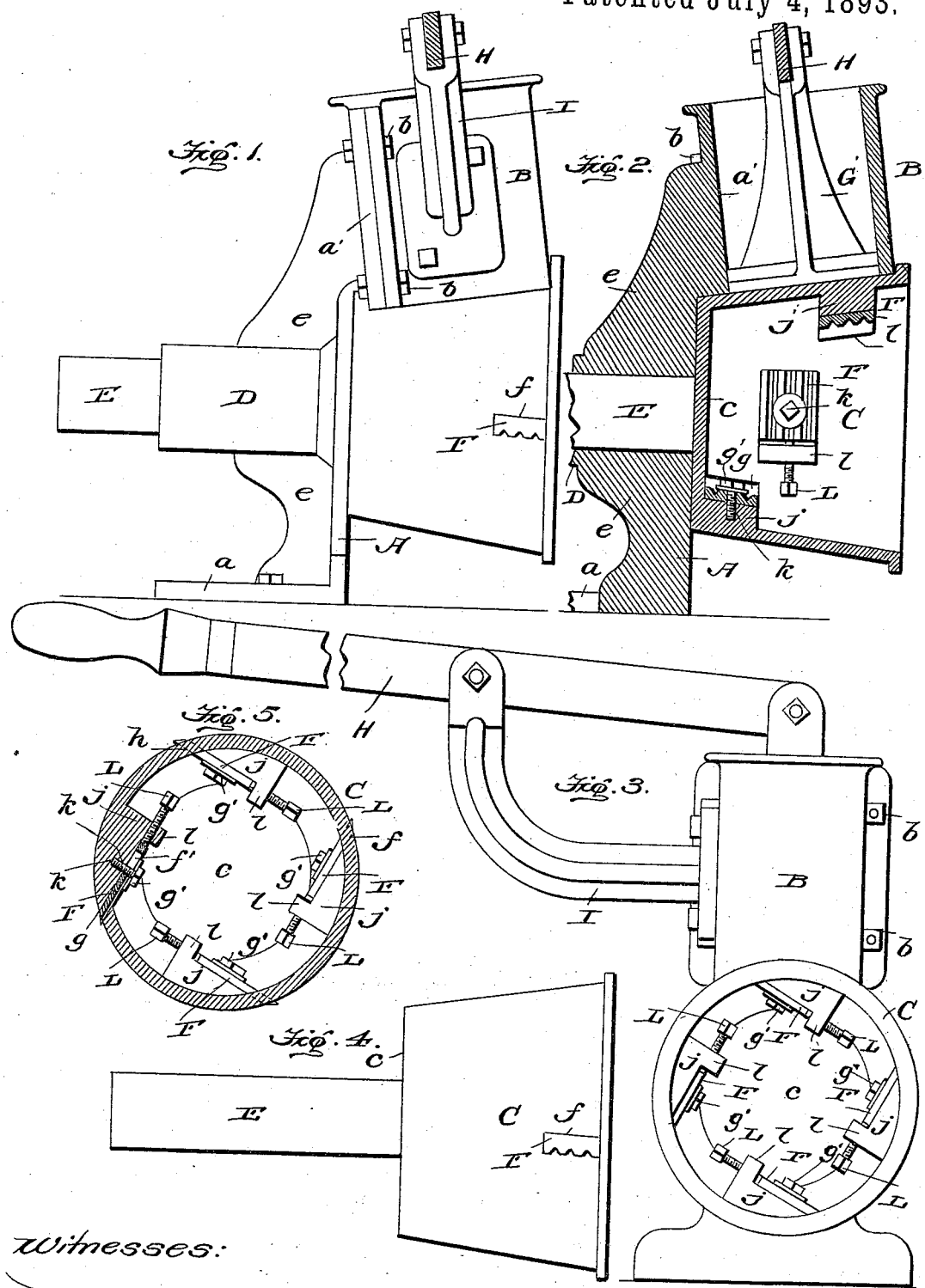

JAMES E. WILSON, OF EASTON, PENNSYLVANIA.

MACHINE FOR CUTTING BONES.

SPECIFICATION forming part of Letters Patent No. 500,986, dated July 4, 1893.

Application filed March 17, 1893. Serial No. 466,515. (No model.)

*To all whom it may concern:*

Be it known that I, JAMES E. WILSON, a citizen of the United States, residing at Easton, in the county of Northampton and State of Pennsylvania, have invented certain new and useful Improvements in Machines for Cutting Bones; and I do hereby declare the following to be a full, clear, and exact description of the invention, such as will enable others skilled in the art to which it appertains to make and use the same.

The present invention is a machine for cutting bones more particularly designed as an improvement upon the machine patented to me on the 10th day of January, 1893; and the object in view is to provide an improved machine in which the cutter cylinder is so constructed as to cut the bones in the hopper more easily and with less power or exertion and at the same time wholly obviate any liability of the machine to become clogged by the cut material lodging on the cutter cylinder.

With these ends in view, the invention consists in the combination with a suitable frame work furnished with a bearing for the cutter-shaft and a hopper for the bones to be cut, of a novel form of rotary cutter cylinder provided around its periphery with a series of spaced slots which are arranged out of line with each other both transversely across its surface and around its periphery, and a series of cutters or knives contained on seats within the cylinder and having their sharpened working edges projected through the slots therein, whereby the cutters or knives are adapted to travel in different paths as the cylinder is rotated and each knife acts successively during each turn of the cylinder on a limited area of the bones or substance which protrude below the hopper, thus contributing to the easy rotation of the cutter cylinder. There is no casing or concave around the cutter cylinder, which operates in a clear space below the open lower end of the hopper, and the knives are set in the slotted cylinder so as to leave a slot. Thus the cylinder is adapted to efficiently cut the bones without clogging in any manner.

The accompanying drawings fully illustrate my invention, in which—

Figure 1 is a side elevation; Fig. 2 is a vertical sectional view; Fig. 3 is a front elevation, and Figs. 4 and 5 are detached views of the cutter cylinder in plan and longitudinal section, respectively.

Like letters denote like parts in all the figures of the drawings, referring to which—

A designates the upright or column; and B the hopper which is united laterally to the upright so that the hopper lies practically to one side of the column A and at a suitable distance above the foot a to accommodate the cutter cylinder C. This upright or column serves to support all of the operative parts of the machine; and at the lower extremity of the column is provided the enlarged right angled foot a, through which can be passed bolts or screws to fasten the machine firmly to a table, block, or any suitable surface. This upright or column A is cast in a single piece. The hopper is likewise cast in one piece, and the cutter C also constitutes a single casting, thus reducing the cost of production. Said upright or column has its upper extremity enlarged to form the face plate a' which is adapted to form one side of the hopper, and the hopper shell B is applied laterally against the face plate a' and fastened thereto by the transverse bolts b, b. The column or upright A is further provided at an intermediate point of its height, between the foot a and the face of the plate a', with a transverse integral bearing D which accommodates the shaft E of the cutter cylinder; and this bearing extends to the opposite side of the upright A from the elevated hopper B so that the bearing is on one side of said upright while the hopper is on the opposite side thereof, thus providing an open space below the hopper to freely accommodate the cutter cylinder. Reinforcement webs or ribs e, are made integral with the upright A and the shaft bearing E to provide the necessary rigidity and stiffness to the bearing without materially adding to the weight of the machine.

The cutter cylinder C is preferably made slightly conical in form, and its inner smaller end is closed by a head c which is integral with the cylinder while its larger outer end is left open so as to expose the interior and the knives to view, thus providing for convenient access to the interior of the cylinder to readily remove any material that may accumulate therein and also enable the knives